United States Patent [19]

Pease, Jr. et al.

[11] Patent Number: 5,024,491

[45] Date of Patent: Jun. 18, 1991

[54] AUTOMATIC AIRCRAFT BRAKING SYSTEM INCLUDING WHEELSPEED RESPONSIVE CONTROL APPARATUS

[75] Inventors: George E. Pease, Jr., Renton; Ervin G. Romero, Seattle; Rudi K. H. Glasenapp, Bellevue, all of Wash.

[73] Assignee: The Boeing Company, Seattle, Wash.

[21] Appl. No.: 845,311

[22] Filed: Oct. 25, 1977

Related U.S. Application Data

[63] Continuation of Ser. No. 743,047, Nov. 18, 1976, abandoned, which is a continuation of Ser. No. 432,911, Jan. 14, 1974, abandoned, which is a continuation of Ser. No. 200,092, Nov. 18, 1971, abandoned.

[51] Int. Cl.$^5$ ................................................ B60T 8/78
[52] U.S. Cl. .......................................... 303/93; 303/97; 303/105
[58] Field of Search .................... 303/90, 93, 97, 105, 303/106, 107, 109

[56] References Cited

U.S. PATENT DOCUMENTS

| 3,520,575 | 7/1970 | Steigerwald | 303/97 |
| 3,537,758 | 11/1970 | Buhler et al. | 303/105 |
| 3,682,512 | 8/1972 | Malon et al. | 303/93 |
| 3,711,163 | 1/1973 | Booher | 303/93 |

OTHER PUBLICATIONS

McPherson, Raymond L., "Developing the Advanced 737 Airplane", Fourteenth Annual Report to the Aerospace Profession, Preprint, Symposium, Sep. 9, 1970.

Primary Examiner—Alvin E. Oberley
Attorney, Agent, or Firm—Christensen, O'Connor, Johnson & Kindness

[57] ABSTRACT

This invention relates to an aircraft braking system which applies and regulates brake pressures automatically upon touchdown to achieve a pre-selected airplane deceleration level. Wheelspeed information signals are processed through wheelspeed logic circuits to provide an input to automatic brake control circuits having further logic circuits which, when satisfied by the presence of other signals, cause further automatic brake control circuits including a ramp generator circuit to generate control signals which are coupled in parallel with the anti-skid system to control the anti-skid valve driving current below skid levels so that braking pressure is increased at a controlled rate to achieve the above-mentioned pre-selected airplane deceleration level.

42 Claims, 10 Drawing Sheets

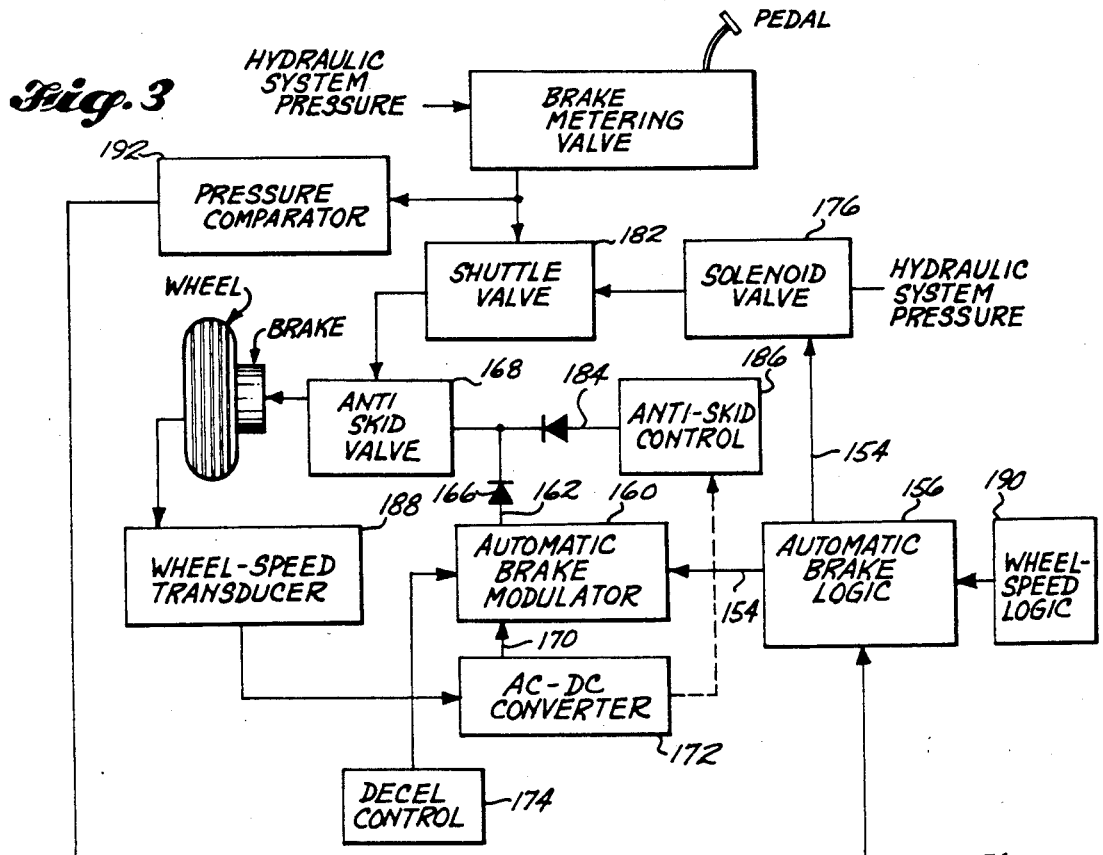
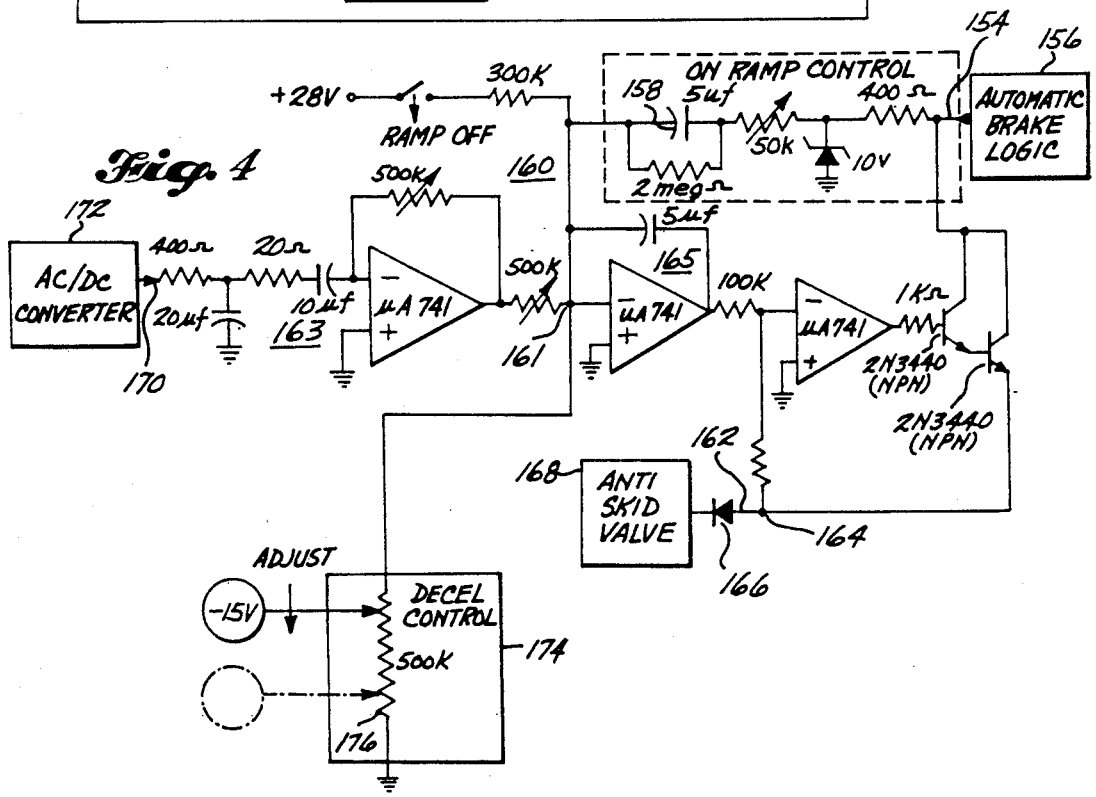

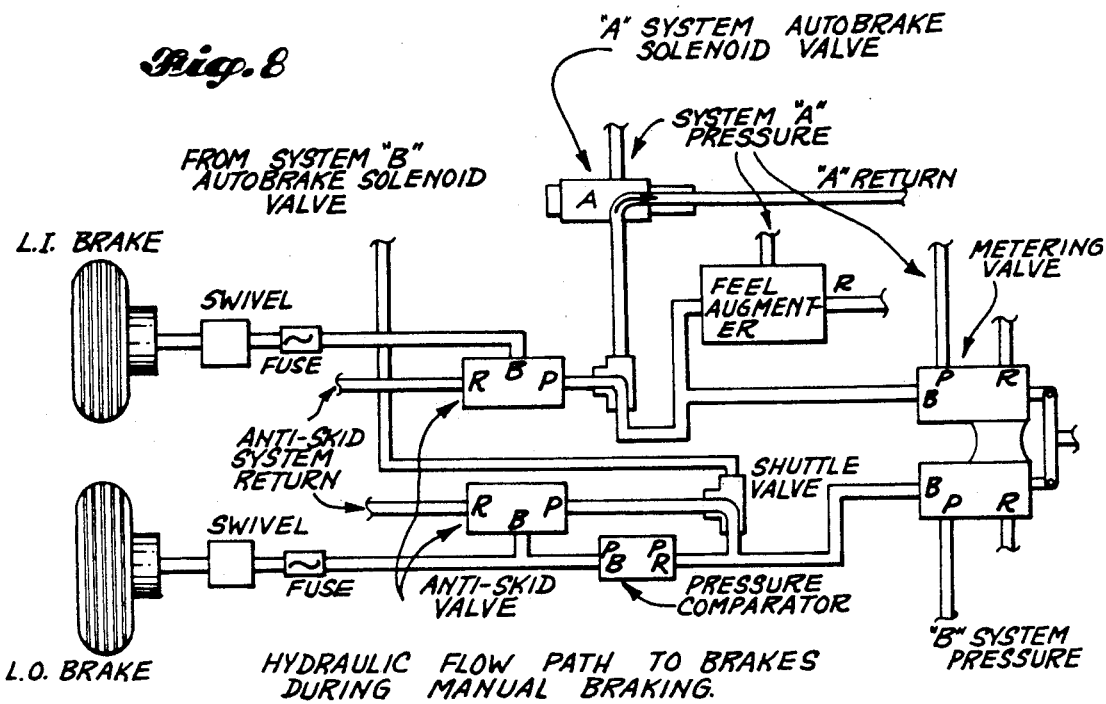
Fig. 8 — HYDRAULIC FLOW PATH TO BRAKES DURING MANUAL BRAKING.
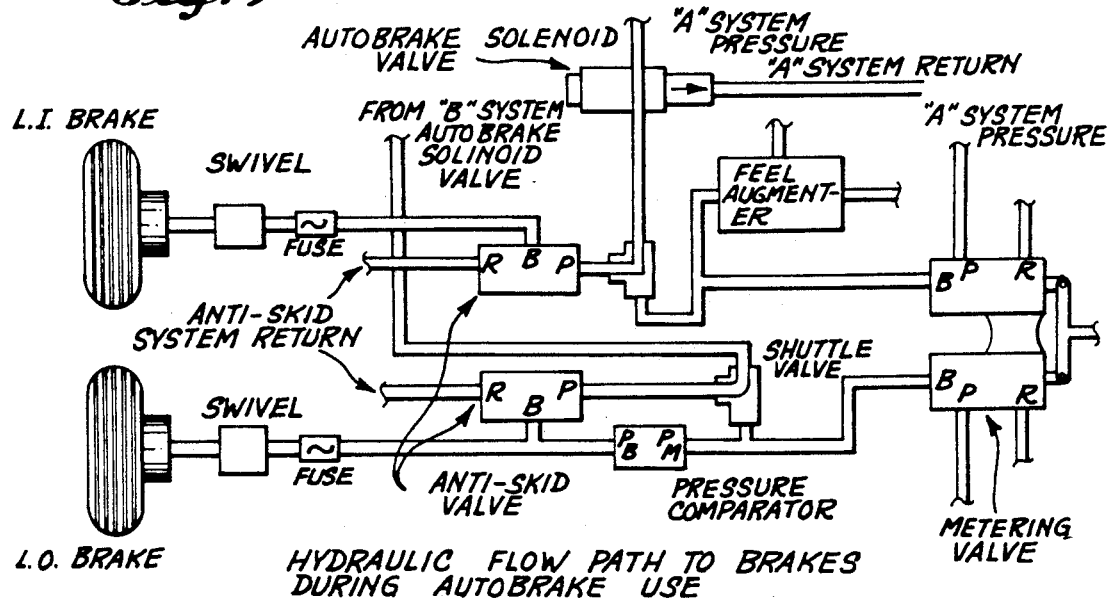
Fig. 9 — HYDRAULIC FLOW PATH TO BRAKES DURING AUTOBRAKE USE

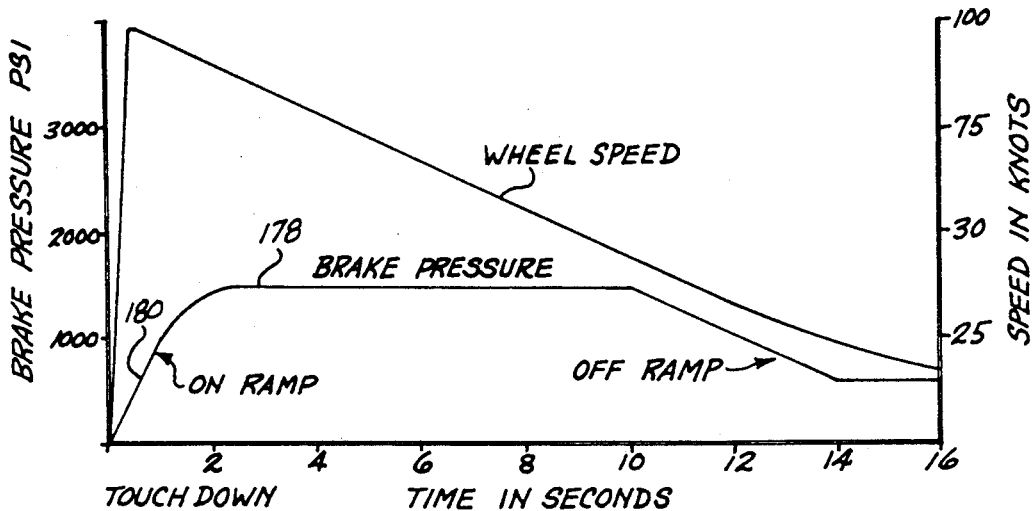
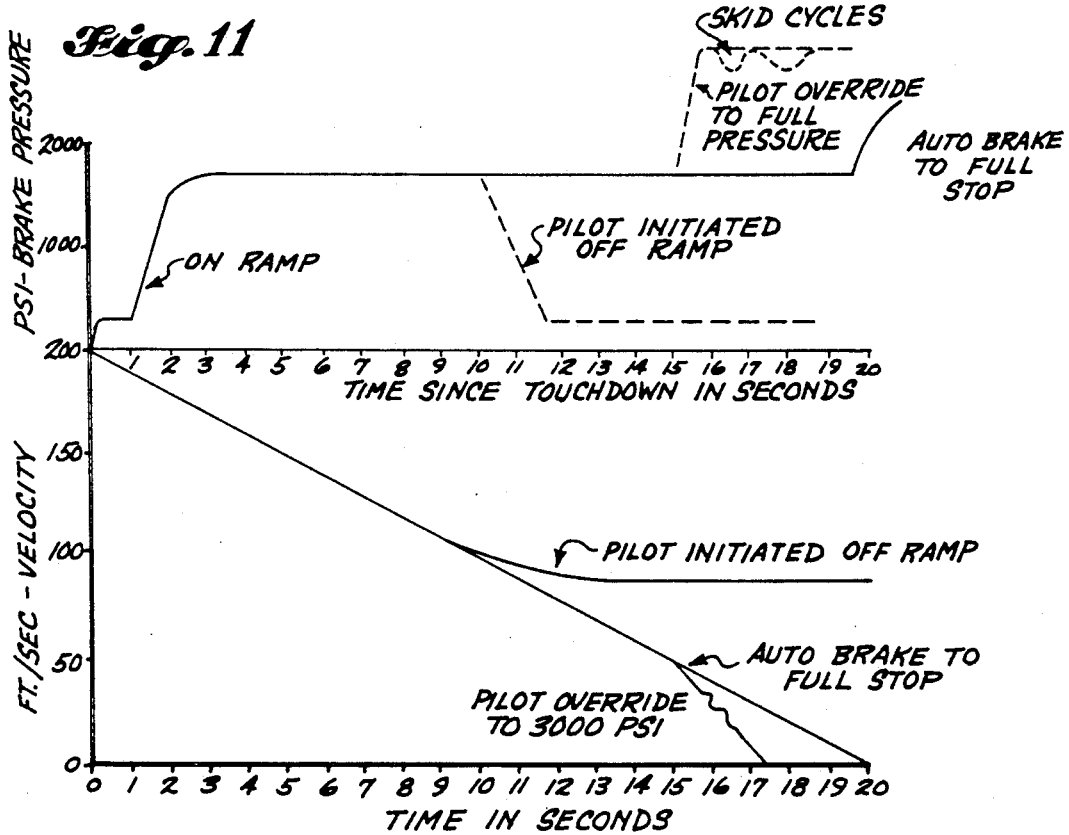
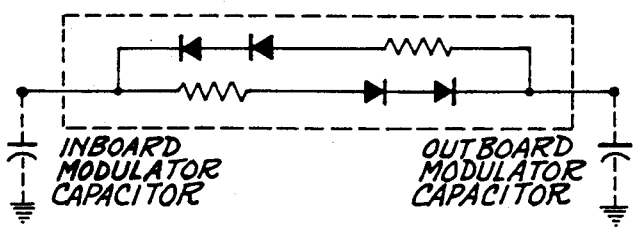

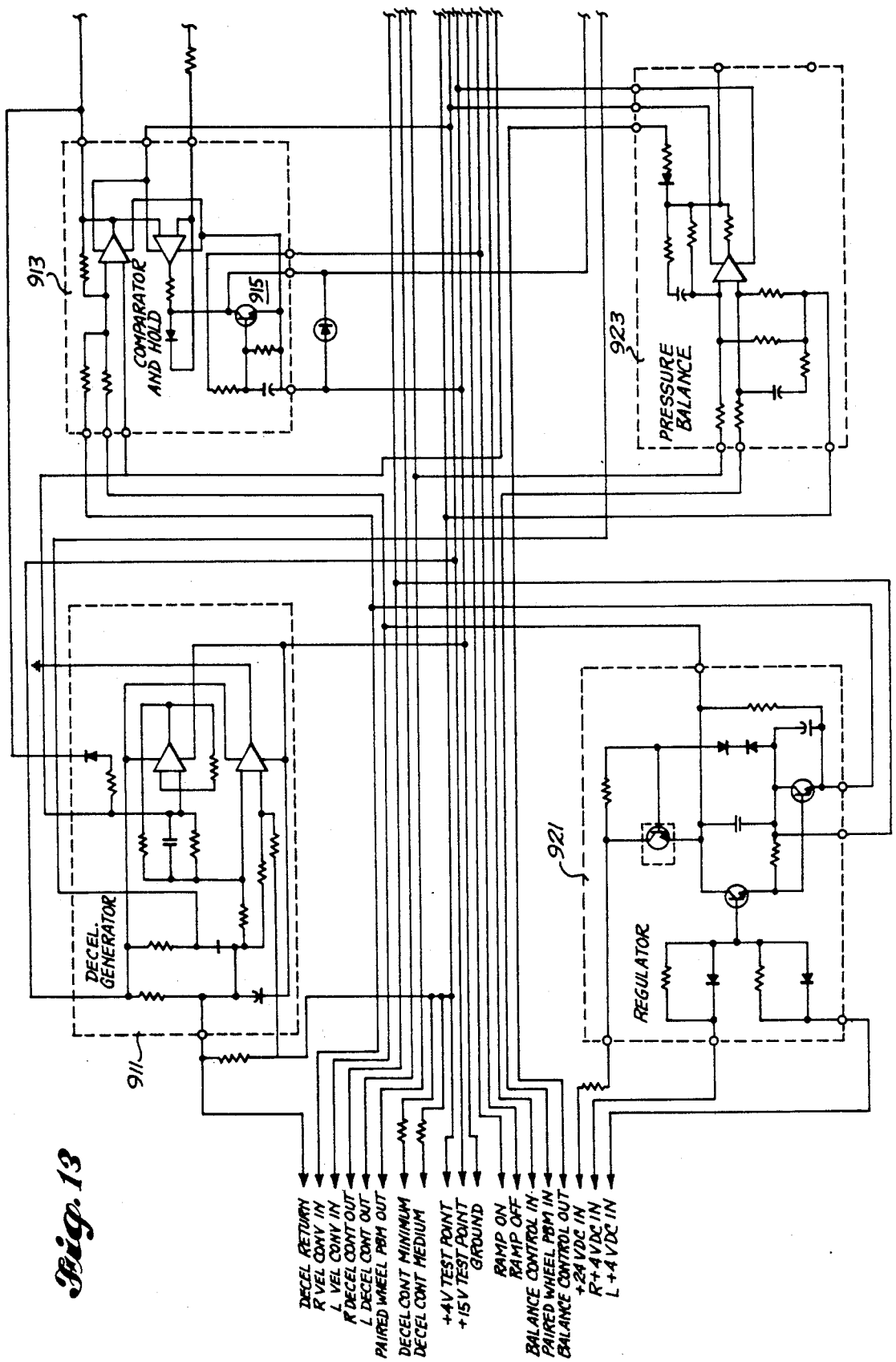

AUTOMATIC AIRCRAFT BRAKING SYSTEM INCLUDING WHEELSPEED RESPONSIVE CONTROL APPARATUS

This is a continuation of application Ser. No. 743,047, filed Nov. 18, 1976, and now abandoned, which in turn is a continuation of application Ser. No. 432,911, filed Jan. 14, 1974, now abandoned which is in turn a continuation of application Ser. No. 200,092, filed Nov. 18, 1971, and also abandoned.

This invention relates to aircraft braking systems and more particularly to logic controlled signal processing of wheelspeed information signals which automatically on touchdown provides automatic brake control signals coupled in parallel with anti-skid control signals as inputs to the anti-skid valve. The logic circuits of the braking system provide automatic braking at the same logical points in the landing sequence of events. The braking system further provides automatic continuous controlled braking at the earliest stage (upon touchdown) thus acting as a landing aid and relieving the pilot of some work load during his busy landing period. The system also eliminates difficult braking judgments which have to be made at high speeds, viz, immediately after touchdown.

Prior art brake control systems, e.g., U.S. Pat. No. 2,907,607, to A. R. Williams only function on the error signal and cannot control to a set deceleration. The aforementioned patent and also U.S. Pat. No. 2,913,072 also to A. R. Williams are ON-OFF systems and not modulating systems.

It should be further noted that these are a multitude of anti-skid systems having various design philosophies which all try to permit maximum braking under certain conditions, e.g., U.S. Pat. No. 3,275,384 to Hirzel; U.S. Pat. No. 3,520,575 to Steigerwald; and U.S. application Ser. No. 843,569 to Romero, a co-inventor of the present invention now U.S. Pat. No. 3,614,174, issued Oct. 19, 1971 to the assignee of the present invention.

The importance of automatic braking in removing the element of human judgment at high speeds and automatically applying brakes of the aircraft upon landing should not be underestimated. Simple mathematics reveals the cause of lower quality judgments in the stopping of a vehicle from higher speeds. If, for example, a vehicle is travelling at a speed of 100 mph and a constant decelerated stop is required, the speed range between 100 mph and 50 mph requires 75 percent of the stopping distance. Note, however, that the remaining, speed range of 50 mph to stop requires only one fourth of the distance. The speed effect on stopping distance is the reason for lower quality judgments at high speed and consequent chances, variations and relating inefficiencies in runway length utilization by human judgment controlled braking systems.

It is therefore an object of the present invention to provide means for automatically braking an aircraft after touchdown at a constant predetermined rate of deceleration for efficient utilization of given field lengths, a higher predetermined rate of deceleration being selectable to achieve repeatable and uniform landing decelerations on shorter field lengths without pilot judgments.

It is a further object of the present invention to provide means for generating control signals based upon wheelspeed signal information for coupling to the anti-skid valves to provide braking of the aircraft at an increasing rate after certain logic conditions are satisfied subsequent to touchdown.

It is yet a further object of the present invention to provide means for separately controlling pressure applications of inboard and outboard wheel pairs in an aircraft to thereby provide symmetrical braking during autobraking in the event of either inboard or outboard pressure control system failures.

It is another object of the present invention to provide means in an automatic braking system for balancing inboard and outboard brake pressures to assure that all brakes consume their proper share of the total brake energy independent of local runway conditions.

It is still another object of the present invention to provide hydraulic power for automatic braking in a brake hydraulic distribution system which includes utilization of a parallel hydraulic path for bypassing full system pressure around the manual brake metering valves to the pressure ports of the anti-skid valves.

It is yet a further object of the present invention to provide means in an automatic braking system for supplying a first braking pressure subsequent to touchdown which is less than a second pressure applied thereafter for softly pulling the nose gear to the ground thereby avoiding slamming down of the nose gear during automatic braking.

It is still a further object of this invention to provide means for releasing brakes from a predetermined deceleration level pressure in a smoother manner than possible in the manual control mode in accordance with a constant pressure decrease OFF ramp function signal.

It is yet another object of the present invention to provide an automatic braking system for landing an aircraft at a constant rate of deceleration automatically after touchdown.

The above and further objects are achieved in the present invention by signal processing means which develops through wheelspeed logic circuits and other circuits including automatic brake logic circuits and ramp generator circuits, modulated automatic brake control signals which can act through the anti-skid system anti-skid valve to provide automatic braking signals initiated after touchdown having certain characteristics which include achieving a uniform rate of deceleration for the aircraft when certain logic conditions are satisfied, viz. by the presence of certain types and quality of signals as inputs to the logic circuits.

A full understanding of the invention, and of its further objects and advantages and the several unique aspects thereof will be had from the following description when taken in conjunction with the accompanying drawings in which:

FIG. 3 is a block diagram of a braking channel for one wheel of the automatic braking system;

FIG. 4 is the schematic diagram of one embodiment of the automatic brake modulator shown in block form in FIG. 3;

FIG. 8 is illustrative of the hydraulic flow path to a pair of brakes of the automatic braking systems of FIG. 2 during the manual braking mode of operation of the system;

FIG. 9 is illustrative off the hydraulic flow path to the same pair of brakes of the automatic braking system of FIG. 2 however during the automatic braking, mode of operation of the system;

FIG. 10 is a graph helpful in understanding the operation of the specific brake modulator embodiment shown in FIG. 4;

FIG. 11 is a time plot showing automatic braking signal control of pressure after touchdown of an aircraft utilizing the system embodiment shown in detailed schematic form in FIGS. 13-14;

FIG. 12 is a schematic diagram of one embodiment of a pressure balance circuit useful for coupling between in automatic braking automatic brake modulators in automatic braking systems, e.g., of the type shown in FIG. 2;

Figure 14:
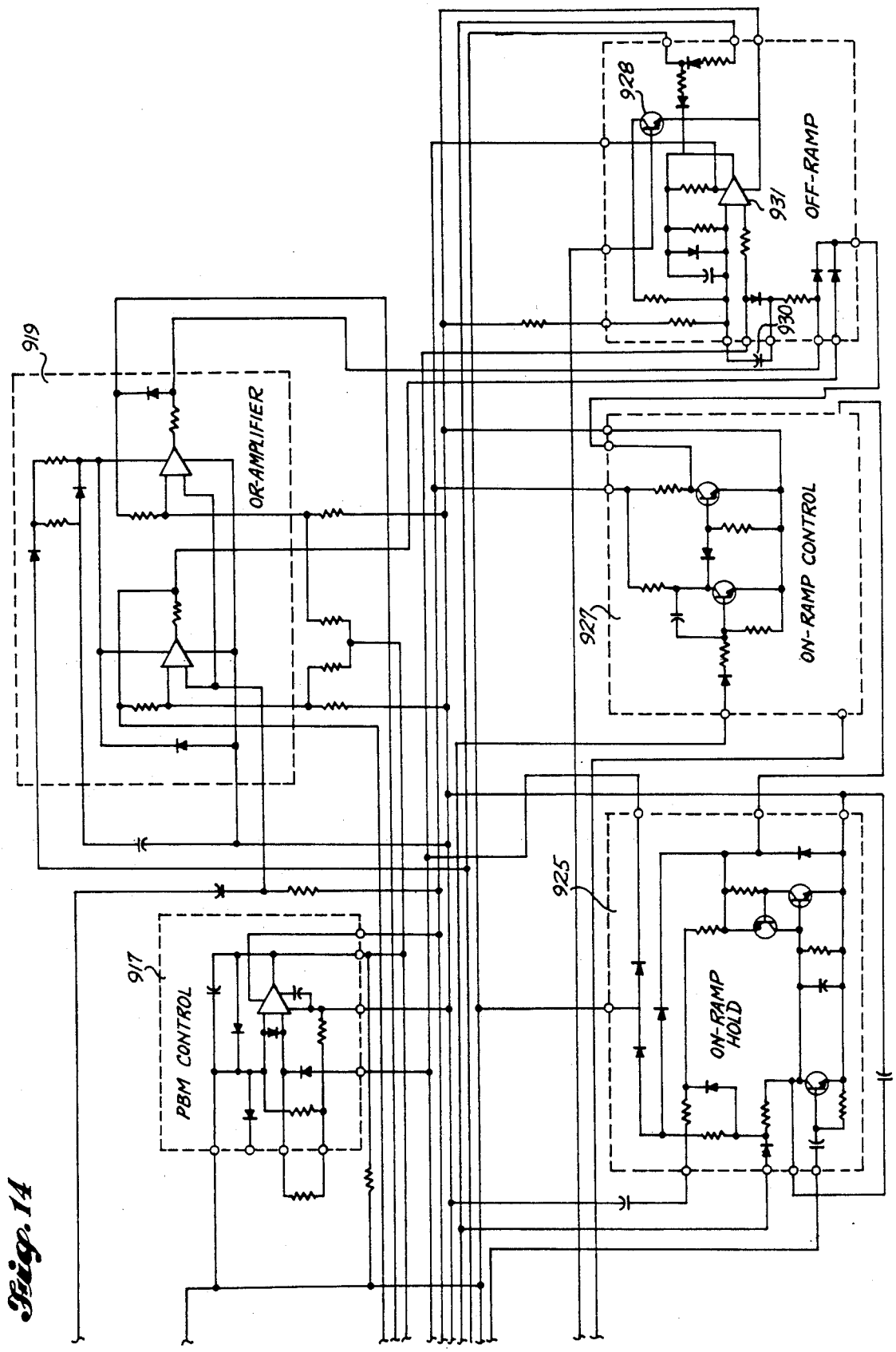

FIGS. 13 and 14 when taken together and placed side by side is a schomatic circuit diagram according to one embodiment of automatic braking circuitry utilized in developing composite automatic brake control signals.

Figure 1:
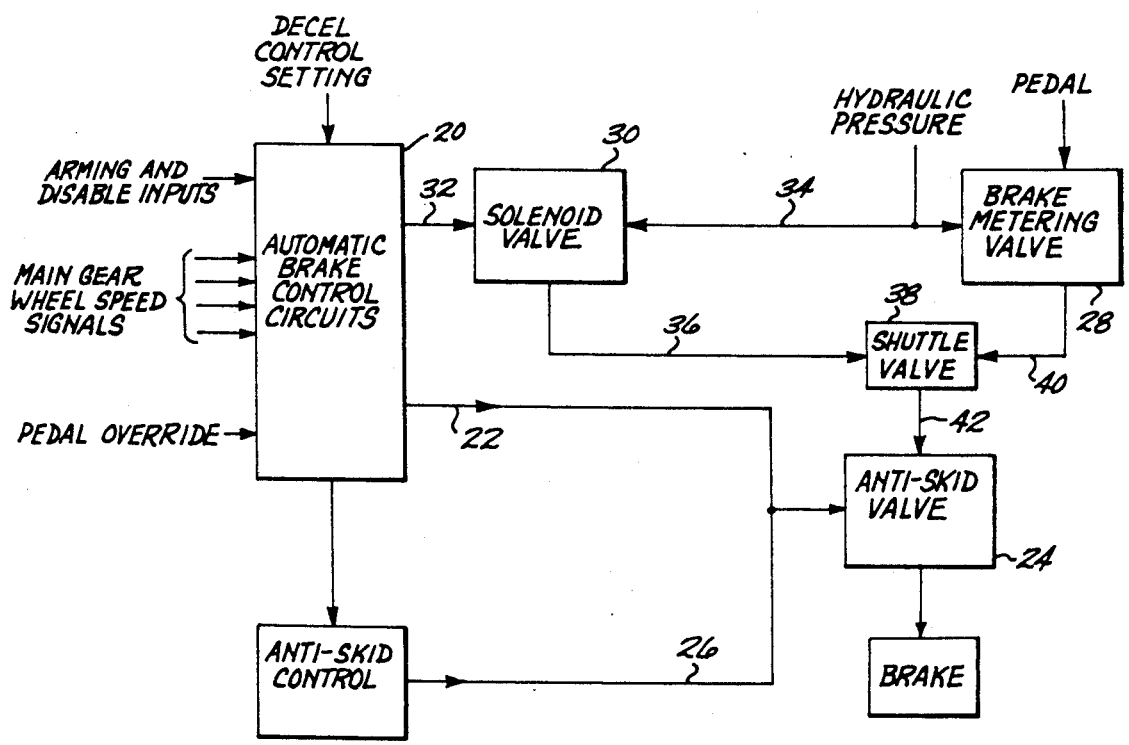
FIG. 1 is a somewhat simplified block diagram of an embodiment of the automatic braking system organization.

Turning now to FIG. 1 it will be seen that automatic brake control circuits 20 have arming and disable inputs which are generated by the opening and closing of switches as will be seen in more detail hereinafter. Further inputs include a desired deceleration control level signal for setting the automatic braking system to a desired deceleration level. After arming inputs are present, then wheel spin up of two or more main gear wheels as described subsequently in more detail initiates the braking action by generating automatic brake control signals 22 which are coupled to anti-skid valve 24 and are permitted to automatically control braking under certain circumstances. Depending upon the information present in the main gear wheelspeed signals, anti-skid control signals 26 may be generated and as shown coupled to anti-skid valve 24 where relief from skid conditions may be had. It should also be seen that a pedal override input signal (generated by a brake switch as described hereinafter) is provided to automatic brake control circuits 20 which enables brief manual disconnect of the system in one mode of operation and pedal control of braking directly through brake metering valve 28 as shown. A hydraulic solenoid valve 30 is used to control hydraulic pressure in the automatic braking system. Solenoid valve 30 is energized by the presence of signal 32 only when certain logic in automatic brake control circuits 20 is satisfied and in such case main hydraulic system pressure 34 is permitted to flow at 36 to one "in" port of shuttle valve 38. Manually metered brake pressure 40 under pedal control is present in some circumstances at the second "in" port of shuttle valve 38. Shuttle valve 38 shuttles either manually metered brake pressure 40 or automatic system pressure 36 through the shuttle valve 38 "out" port at 42 whichever is greater by a predetermined amount, e.g., 150 psi, the "out" port and one of the "in" ports being thus always connected. A more detailed description of the various control features in the system and the logic under which the various control features are exercised will now be utilized to amplify the understanding of the system had in reference to FIG. 1.

Figure 2:
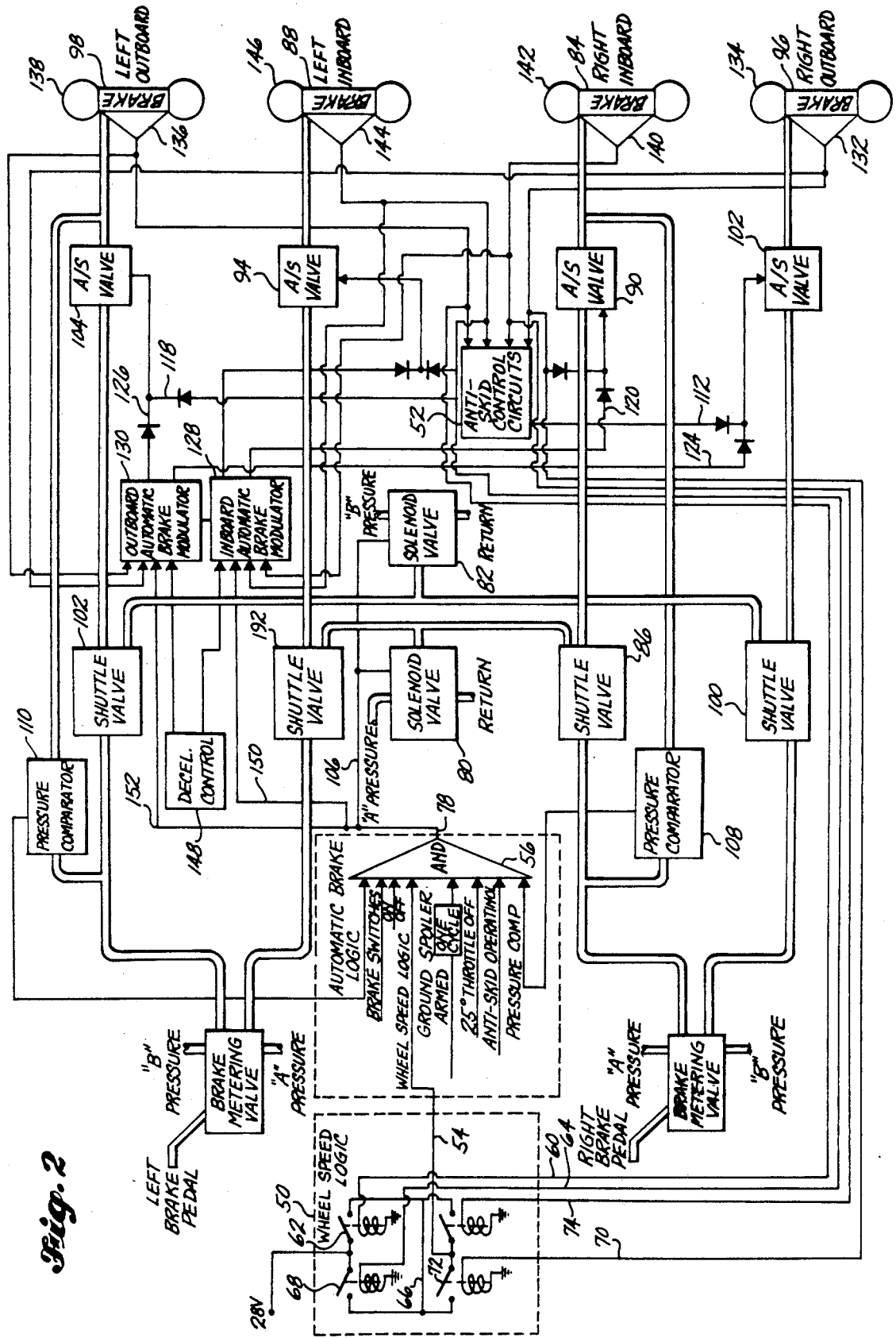
FIG. 2 is a more complete block and schematic diagram of the automatic braking system in a four wheel aircraft embodiment of the invention.

It will be seen now with reference to the automatic braking system embodiment as shown in FIG. 2 how the system employs certain operational features which do not create undesirable situations themselves and further how the system allows the pilot to make corrections to the aircraft during normal and abnormal situations.

A first consideration is the possibility of landing the airplane with the wheels locked. Wheelspeed logic circuits 50 and anti-skid control circuits 52 function together however to prevent such a possibility. Wheelspeed logic circuits 50 require that a pair of wheels on opposite sides of the aircraft must be turning at least 60 knots before providing wheelspeed logic output control signal 54 which is coupled as one of the inputs to AND circuit 56 within automatic brake logic means 58. More specifically when left outboard wheelspeed signal 60 exceeds 60 knots the relay controlled switch 62 becomes energized and closes causing the 28 volt reference voltage to be present on lead 66, OR if left inboard wheelspeed signal 64 exceeds 60 knots the relay controlled switch 68 closes causing application of the 28 volt reference voltage to lead 66. Now if right outboard wheelspeed signal 70 exceeds 60 knots the relay controlled switch 72 closes AND applies the reference voltage if present on lead 66 as a wheelspeed logic output control signal 54 to AND circuit 56, OR if right inboard wheelspeed signal 74 exceeds 60 knots the relay controlled switch 76 closes AND applies the reference voltage (28 volts) if present on lead 66 as a wheelspeed logic output control signal 54 to an input terminal of AND circuit 56. Wheelspeed logic circuit 50 thus comprises first and second OR circuits which are series connected to thereby provide the AND function on the OR circuit outputs, the first OR circuit output terminal being considered as lead 66 and the second OR output terminal then being the lead carrying signal 54. This AND and OR circuit logic may be implemented by means other than the switching as shown and not only prevents the automatic braking system from locking the wheels before touchdown but also prevents brake application with only one gear on either side of the aircraft (in this embodiment the right gear carrying the right inboard and outboard wheels or the left gear carrying the left inboard and outboard wheels) down on the runway. If the aircraft should bounce on landing, the anti-skid control circuits 52 will treat the resulting locked wheels as a skid and release the brakes.

A further consideration is that the pilot must be able to make yaw corrections at any time in the approach and landing. Therefore, full differential braking must be available to him without any additional pilot activity. Inherent in the present system design is that no single system failure can cause brake lockup on one side only thereby preventing additional yaw correction requirements.

Importantly, if an abnormal situation does arise, this system provides for normal pilot reflex corrective action to cause system disengagement in one of the several system modes of operation hereinafter described in detail. The initiation of this mode of system turn off in a particular manner may be initiated by the utilization of switches on the brake pedal buss system adjusted to provide system turn off in a particular manner with only slight brake pedal travel. In brake pedal switching to initiate a system turn off mode, the brake pedal switching is arranged so that the pilot need only move slightly either or both of his brake pedals to cause automatic braking system control to be interrupted. If a "go around" is required normal throttle advancement causes immediate system disengagement as well. The brake switching for interruption causes the brake switches signal shown as an input to AND circuit 56 to be removed and the AND logic not to be satisfied, while when the 25 degrees of throttle is exceeded, the 25 degree throttle OFF signal causes this input to AND circuit 56 to be removed also resulting in another condition where AND logic of circuit 56 is not satisfied. When all system requirements for system engagement have been met then a system turn ON control signal 78 is provided at the output of AND logic circuit 56. Thus automatic brake logic circuit 58 allows automatic brake control signal generation and brake application to the wheels if and only if:

(1) The ON-OFF switch is ON.
(2) Wheelspeed signals have satisified wheelspeed logic circuit 50.
(3) The automatic ground spoilers are armed.
(4) The throttles are not at go around thrust (above 25° position).
(5) The anti-skid system is operational.
(6) The brake pedal switches have not tripped.
(7) The pressure comparator generated signal does not indicate to great a pressure difference between manual and automatic brake pressures and the need for automatic brake system disengagement with manual brake pressure control takeover.

The above conditions when met simultaneously cause the braking system to then begin to control braking in a particular manner of sequential brake pressure applications as hereinafter described.

In the automatic braking system of FIG. 2, a first hydraulic solenoid valve 80 is utilized to control the hydraulic pressure application from the first main hydraulic system (termed "A" pressure) to the right inboard brake 84 and the left inboard brake 88. In the hydraulic flow path between first hydraulic solenoid valve 80 and right inboard brake 84 are in order, first shuttle valve 86 and first anti-skid valve 90, while in the hydraulic flow path between first hydraulic solenoid valve 80 and left inboard brake 88 are in order second shuttle valve 92 and second anti-skid valve 94.

In the automatic braking system of FIG. 2, a second hydraulic solenoid valve 82 is utilized to control the hydraulic pressure application from the second main hydraulic system (termed "B" pressure) to the right outboard brake 96 and the left outboard brake 98. In the hydraulic flow path between second hydraulic solenoid valve 82 and right outboard brake 96 are in order, third shuttle valve 100 and third anti-skid valve 102, while in the hydraulic flow path between second solenoid valve 82 and left outboard brake 98 are in order fourth shuttle valve 102 and fourth anti-skid valve 104. When automatic brake logic circuit 58 is satisified in the manner mentioned previously then system turn ON control signal 78 is coupled via first conductive element 106 to first solenoid valve 80 and second solenoid valve 82 which are energized to permit an automatic braking mode of operation. With system turn ON control signal 78 absent, first solenoid valve 80 and second solenoid valve 82 are connected to the return systems of their respective main hydraulic systems.

As previously noted, four shuttle valves 86, 92, 100, and 102, one for each brake are used in the system of FIG. 2. Each of these shuttle valves is a three port, two position device with two "in" ports and one "out" port. The "out" port and one of the "in" ports are always connected. If the pressure at one of the "in" ports is greater (e.g., 150 psi greater) then that at the other "in" port, the shuttle valve shuttles to connect the greater pressure to the "out" port. Each of the "out" ports of shuttle valves 86, 92, 100, and 102 are coupled to their respective anti-skid valve inputs and shuttle either manually metered brake pressure or automatic system pressures from the solenoid valves to these anti-skid valve inputs whichever pressure is greater. The aforementioned shuttle valves 86, 92, 100, and 102 are a system requirement because the solenoid valves 80 and 82 when not energized have out ports porting to the return system where manually metered pressure would go without these shuttle valves. The present shuttle valves 86, 92, 100, and 102 arrangement further provides a means for isolating the manual and automatic hydraulic subsystems in the overall automatic braking system of FIG. 2 and e.g., bursting of a fitting at the solenoid valves 80 or 82 would not prevent both the automatic and manual subsystems from normal operation. Further, the pressure equalizing feature provided by pressure comparators 108 and 110 as hereinafter discussed dictates this isolation of manual pressure isolation. In no case can half the brakes be on automatic system pressure and half the brakes on manual to provide differential braking since either pedal switch when depressed as discussed above causes removal of that brake switch signal to AND logic circuit 56 and consequent interruption of automatic braking.

The four anti-skid valves 102, 90, 94, and 104 are used respectively one for each brakes 96, 84, 88, and 98. Anti-skid valves 102, 90, 94, and 104 are two stage electromechanical servo valves which control the pressure to the respective brakes 96, 84, 88, and 98 under control of first, second, third, or fourth anti-skid signals 112, 114, 116, and 118 respectively when these signals are generated by anti-skid control circuits 52. Valves 90 and 94 may control pressures to the respective brakes 84 and 88 under control of first and second automatic brake control signals 120 and 122 respectively when these signals are generated by inboard automatic brake modulator circuit 128. Valves 102 and 104 may control pressures to the respective brakes 96 and 98 under control of third and fourth automatic brake control signals 124 and 126 when these signals are generated by outboard automatic brake modulator circuit 130. Briefly, with respect to anti-skid signals 112, 114, 116, and 118 or automatic brake control signals 124, 120, 122, and 126 controlling of respective anti-skid valves 102, 90, 94, and 104, it should be noted that the characteristics of anti-skid control circuits 52 calls for increasing pressure commands by anti-skid control signals 112, 114, 116 and 118 at decelerations below a predetermined value, e.g., about 17 (below 16 to 18 feet/sec$^2$ decelerations) and decreasing pressure commands above this first predetermined value while the characteristics of inboard and outboard automatic brake modulators 128 and 130 call for increasing to decreasing pressure commands by inboard first and second automatic brake control signals 120 and 122 and outboard third and fourth automatic brake control signals 124 and 126 at a second predetermined and preselected deceleration rate of one of a plurality of constant deceleration rates desired in automatically braking the aircraft, e.g., 4, 7 or 10 feet/sec$^2$. Since the present automatic braking system arrangement allows anti-skid valve input signal priority for the signal having the lower pressure command priority, the automatic brake control signals 120, 122, 124, and 126 which are seen to have the lower pressure command requirements as seen in the preceeding govern except when anti-skid signals 112, 114, 116, and 118 are present commanding lower pressures due to the sensing of skidding wheel(s). The four brakes 96, 84, 88, and 98, one for each wheel on the main gear of the aircraft are standard multiple disc brakes having stators and rotors as used in many of today's brake systems. These brakes are actuated in the normal fashion by multiple pistons getting pressure from the anti-skid valve. No special brake is thus required in the present automatic braking system. A right outboard wheelspeed transmitter 132 in the hub of right outboard wheel 134 generates right outboard wheelspeed signal 70 which is coupled to anti-skid control circuits 52 and to wheelspeed logic circuit 50. Left outboard wheelspeed transmitter 136 in the hub of left outboard wheel 138 generates left outboard wheelspeed signal 60 which is also coupled to anti-skid control circuits 52 and to wheelspeed logic circuit 50, while right inboard wheelspeed transmitter 140 in the hub of right inboard wheel 142 generates right inboard wheelspeed signal 74 which as the previous wheelspeed signals is coupled to anti-skid control circuits 52 and to wheelspeed logic circuit 50, and lastly, after the same fashion left inboard wheelspeed transmitter 144 in the hub of left inboard wheel 146 generates left inboard wheelspeed signal 64 which is coupled to anti-skid control circuits 52 and to wheelspeed logic circuit 50. From the immediately previous description it is clearly seen how both anti-skid and automatic brake control signals are developed from the same means, viz., wheelspeed transmitters 132, 140, 144, and 136 which provide the wheelspeed information signals and these anti-skid and autobrake control signals are both applied to the same means, viz., the anti-skid valves 102, 90, 94, and 104.

Turning now to the following brief description of system operation, the pilot while making his approach, turns the automatic braking system "ON-OFF" switch to ON providing one of the inputs to AND logic circuit 56 as shown in automatic brake logic means 58 and adjusts deceleration control means 148 for the selected rate of deceleration desired for automatically braking the aircraft, e.g., the low (4 ft/sec$^2$) medium (7 ft/sec$^2$) or high (10 ft/sec$^2$) rates hereinbefore mentioned. The pilot then generates a ground spoiler armed signal (shown as one of the inputs to AND circuit 56) by moving the ground spoiler into the armed detent position which closes a switch providing the signal (+28 volts D.C.). The co-pilot turns the anti-skid system control circuits 52 ON and checks that the anti-skid system is operational. A signal is generated by skid system monitoring logic and utilized as an input to AND circuit 56 as shown in FIG. 2. These initial steps ready the aircraft before touchdown for an automatic breaking system landing. On touchdown as explained previously, wheelspeed logic circuit 50 responds to wheelspeed information to provide wheelspeed logic output control signal 54 when at least one wheel on a landing gear on each side of the aircraft is turning at a wheelspeed greater than a predetermined rate, viz., 60 knots. If the remainder of AND logic of circuit 78 is satisfied then system turn ON control signal 78 causes solenoid valves 80 and 82 to port the automatic braking system hydraulic pressure (e.g., 3000 psi) to respective inboard and outboard pairs of anti-skid valves 90, 94, 102, and 104. At the same time as the solenoid valves 80 and 82 are energized function generators within inboard and outboard automatic brake modulators 128 and 130 are energized by system turn ON control signal 73 coupled to the respective modulators along leads 150 and 152. The exact nature of the automatic brake control signals 120, 122, 124, and 126 and the manner in which the function generators operate to provide the desired pressure control by these signals will be had hereinafter in reference to FIG. 4 which shows the circuit schematic of an automatic brake modulator. However, at this point it may be noted that one characteristic of the function generator during automatic brake modulator circuit operation after touchdown is that it raises brake pressure according to a ramp function at a constant rate, e.g., 700 psi during a period subsequent to touchdown until the pressure called for by the preselected constant rate of deceleration in the modulator is reached after which the pressure called for by the automatic brake control signals becomes that necessary to maintain the selected rate of deceleration. Thus, a constant rate of increase in braking is achieved rather than all at once during the above-mentioned period after touchdown giving an unusually smooth application of braking. During the landing roll of the aircraft the deceleration is continuously kept constant at the preselected rate; as the thrust reversers come on the brake pressure is reduced by automatic brake pressure control signals 120, 122, 124, and 126 applied respectively to anti-skid valves 90, 94, 102, and 104 to maintain the preselected constant deceleration.

When the pilot has slowed the aircraft by utilization of the automatic braking system to a desired speed and he wishes to resume immediate control, he has several methods to do so. A useful method under many circumstances is to move the brake pedals thereby actuating the brake pedal switches. Another method is to turn OFF the system ON-OFF switch. Yet a further method in the immediate turn OFF mode is to put the speed brake handle (ground spoiler handle) into the DOWN detent. Any of the above three methods cause immediate brake release operation in the immediate turn OFF mode and provide the pilot with manual braking control (see FIG. 6 for the immediate drop out logic of the system which results in return to manual control under these pilot inputs.

Turning now to FIGS. 3 and 4 (placed on the same page of the drawings), a more complete description of the braking channel for one wheel of the automatic braking system of FIG. 2 will be made and by way of further explanation and understanding the FIG. 4 schematic will be here described in conjunction therewith so that the functions of one automatic brake modulator embodiment within the braking channel of FIG. 3 are clearly understood (a further embodiment of automatic brake modulator circuit appears in the circuit schematic of FIGS. 13-14).

In ON RAMP control in the circuit of FIG. 4, at the initiation of automatic brakes, automatic brake logic 156 supplies a 28 volt system turn ON control signal 154. This signal 154 energizes the ON RAMP control circuit and charges capacitor 158 to 10 volts. The current required to charge capacitor 158 slews the 5 microfarad integrator capacitor to approximately 10 volts. This causes a low brake pressure to be applied to the brakes for autobrake initiation. Airplane deceleration is very low at this point in time, the input to the integrator is negative and the integrator ramps positive which calls for a positive pressure ramp.

In FIG. 4 OFF RAMP control, the OFF RAMP injects a signal into the integrator which ramps pressure off. The pilot's pedal or spoiler handle switch closes the ramp off switch shown in FIG. 4 which causes a negative ramping voltage which ramps pressure off.

The deceleration control output from deceleration control means 174 is summed at circuit connection 161 with the deceleration circuit 163 output. Current flows out of the integrator circuit 165 into deceleration control means 174 for low rates of deceleration and into the integrator 165 from deceleration circuit 163 for high rates of deceleration.

As hereinbefore mentioned when a pair of wheels, at least one of which is on opposite sides of a vertical plane bisecting the longitudinal axis of the aircraft (one on each side of the aircraft) reach a predetermined speed as mentioned earlier and certain other requirements are met automatic braking is initiated whereby a system turn ON control signal 154 is generated by automatic brake logic circuits 156 and capacitively coupled (see FIG. 4) into automatic brake modulator circuit 160 (shown in full form in FIG. 4 and in block form in FIG. 3) causing the modulator capacitor 158 voltage to build up to a maximum voltage in a very short period of time (0.1 second). Modulator circuit 160 of FIG. 4 then generates an automatic brake control signal 162 at output terminal 164 which is coupled by means of diode 166 to anti-skid valve 168.

Modulator circuit 160 provides an autobrake output signal 162 representative of an increase in brake pressure at a constant rate (see FIG. 10) until the rate of deceleration of the vehicle determined by modulator circuit 160 from the information signal 170 representative of wheelspeed obtained from AC-DC converter 172 equals the preselected rate of deceleration desired for automatic landing as determined by deceleration control means 174 which involves the choice of setting of potentiometer 176. Once constant pressure increase causes the target deceleration to be reached, modulator circuit 160 retains the pressure required for constant deceleration regardless of external effects on deceleration such as, e.g., reverse thrust applications. Thus initial buildup of pressure termed the "ON RAMP" pressure portion 180 of the automatic brake control signal waveshape 178 (see again FIG. 10) allows an even application of brakes substantially independent of runway conditions (absent a skid condition). Simultaneously with the turn on of the brake modulator by system turn ON control signal 154 and the initiation of the ON RAMP pressure command of automatic brake control signal 162, turn ON control signal 154 since also applied to solenoid valve 176, causes system hydraulic pressure to be applied to the brake by way of shuttle valve 182 and anti-skid valve 168 to a level controlled by the voltage level of automatic brake control signal 162 representative of the particular pressure command of automatic brake modulator 160. Anti-skid valve 168 thus regulates pressure to the brake under control of automatic brake control signal voltage 162 and the anti-skid control signal voltage which signal voltages are both summed or dioded to the anti-skid valve 163 input. At any time during the automatic programmed stop, the flight crew has the capability of overriding automatic braking mode of the system by changing one of the inputs to automatic brake circuits 156 as discussed earlier in connection with the description of FIG. 2, viz., as by advancing the throttles, applying one brake pedal, applying both pedals to a pressure equal to that on the brakes or by applying, then releasing one or both brake pedals.

In FIG. 3, it will be recognized that known anti-skid control systems utilize the circuitry of blocks 168, 186, 188, and 172 while blocks 182, 176, 160, 156, 190, 174, and 192 are further required to implement the present automatic braking functions. The automatic braking system may be considered as providing a finer control in parallel with the anti-skid system. Automatic brake modulator circuit 160 is not required to perform over-torque and skid control since the operation of automatic brake control, as hereinbefore discussed, is below the normal skid point and the known anti-skid control circuit 186 can control for ground discontinuities.

In order to provide automatic braking pressures providing the characteristics shown in FIG. 11 at pilot option, the system of FIG. 2 anti-skid circuits 52 may comprise for each of wheels 138, 146, 142, and 134 an anti-skid control circuit of the type shown in FIGS. 1 or 4 of U.S. patent application Ser. No. 843,569 filed July 22, 1969 by E. G. Romero, now U.S. Pat. No. 3,614,174, issued Oct. 19, 1971, and assigned to the assignee of this application which circuits are herein incorporated by reference or other anti-skid circuits. Automatic brake modulator circuits 128 and 130 of FIG. 2 of this application may each comprise one of the circuits of combined FIGS. 13 and 14 (placed side by side with leads matching up).

FIGS. 13 and 14 show pilot operated inputs for selecting a minimum, medium, or maximum rate of deceleration when a pilot switched 28 volt source is applied to the selected lead. Wheelspeed input leads are coupled to the wheelspeed transducers (as shown in FIG. 2) of a right and left wheel and corresponding right and left deceleration control signals are developed by the circuits of FIGS. 13 and 14 which are utilized to control the respective anti-skid valves of each wheel.

The automatic brake modulator circuit of FIGS. 13 and 14 is a further embodiment and further illustrative of an automatic brake modulator of the type shown in FIG. 4 and the following description with respect to FIGS. 13 and 14 will also aid in a better understanding of the types of functions already described with respect to the FIG. 4 circuit.

Deceleration generator circuit 911 comprises an integrator circuit which adjusts itself to the peak velocity of wheelspeed and then decreases its output according to the selected deceleration input. For a maximum selected deceleration, an open circuit condition is required. For minimum preselected deceleration, continuity is provided (by conductive connection such as a switch) between the deceleration control minimum lead and the deceleration return leads shown. For a medium rate of deceleration, continuity is provided (by switch so marked) between deceleration control medium and deceleration return leads shown.

Comparator and hold circuit 913 compares the sum of actual wheelspeed signals of the two wheelspeed inputs ($R_{vel}$ converter in and $L_{vel}$ converter in) with the velocity output signal from deceleration generator circuit 911. Switching transistor circuit 915 disables the circuit during off ramp operation.

PBM control circuit 917 comprises an integrator circuit which performs an integration function on the comparator and hold circuit 913 output signal to control pressure.

OR amplifier circuit 919 comprises two isolation amplifier circuits which couple the PBM control signals to the left and right valve driver circuits.

Regulator circuit 921 provides a regulated D.C. voltage to the operational amplifier circuits of FIG. 13.

Pressure balance circuit 923 monitors the two PBM control signals, each pressure balance having the ability to reduce the modulation level of the other PBM control if its PBM control has a lower level. This action raises the lower control brake pressure to the higher level. If this action tends to increase airplane deceleration above the control point, both PBM control voltages will increase and reduce pressure together.

ON ramp hold circuit 925 comprises a timing circuit which prevents the OFF ramp from operating during ON ramp control. Since the OFF ramp is already disabled it provides a type of bootstrap function.

OFF ramp circuit 927 is energized by turning off transistor 928. The circuit 927 functions as a closed loop integrator that forces the PBM control to increase its voltage at a rate which causes capacitor 930 to balance its differential voltage. If the amplifier 931 voltage increases, the pressure reduction rate increases, while a decrease in this voltage decreases pressure reduction rate.

The complete system of FIG. 2 incorporating the automatic brake modulator circuits of FIGS. 13 and 14 may incorporate the pressure balance circuit of FIG. 12 instead of the pressure balance circuit shown on the FIG. 13 portion of the FIGS. 13 and 14 automatic brake modulator circuit. Referring to the pressure balance circuit of FIG. 12, it will be observed that if the outboard modulator, for instance, has a higher voltage than the inboard and the diode voltage drop is overcome, current will flow from the outboard capacitor to the inboard raising the outboard brake pressure and lowering the inboard brake pressure which tends to reduce braking differences between wheels.

Turning now to FIG. 11, it can be seen that the ON ramp functions meet the following requirements:

1) It supplies a small pressure during nose gear transition to softly pull the nose gear to the ground (e.g., a 300 psi level). This avoids an uncomfortable slamming down of the nose gear.

2) The deceleration increase is required to be at a comfortable and substantially constant level (e.g., a pressure increase of 700 psi/sec).

It can thus be seen that, e.g., 300 psi is applied for a fraction of a second and then a slope of 700 psi/sec pressure is applied. As seen in FIG. 11, the ON ramp to constant deceleration is one continuous function of brake pressure application having the above-mentioned transitions, and note further the OFF ramp must be initiated by the pilot. The OFF ramp provides a smooth means of transfer from automatic braking mode to manual brakes. It allows the pilot to release the brake pressure in a constant manner noted for smoothness unlike any such physical action in the manual mode. Either brake pedal action or the spoiler handle will initiate the OFF ramp signal provided by the automatic brake modulator circuit shown in FIGS. 13 and 14. The system logic subsequent to the above-mentioned pilot action termed "Automatic Smooth Manual Override" is shown in FIG. 7, while other modes of switching the system off, such as heavy pedal application, allow the pilot's natural reaction to cancel the automatic braking abruptly and the logic of the system under such conditions may be followed for ease in understanding this mode by making reference to FIG. 6 where autobrake "immediate" dropout logic is diagrammed. The system of FIG. 2 incorporating the automatic brake modulators of the type shown in FIGS. 13 and 14 provide an OFF ramp pressure command operating within the region of 1 to 2 seconds duration depending on pressure being applied to the brakes while fast pedal application of the automatic braking system in accordance with the system method steps shown logically in FIG. 6 results in manual acquisition in less than one tenth of a second. The manner of initiating automatic braking and actions in sequence as taken within the system can be easily seen by reference to "Autobrake ON Logic" shown in FIG. 5.

Returning now to FIG. 11, it will be remembered from the preceeding that the "ON" ramp function is initiated automatically at touchdown, and as soon as at least one wheel on each side of the aircraft (e.g., one on each of the left and right main landing gears as herein described) has spun up to approximately 60 knots as initial pressure of approximately 300 psi is applied to each brake. A fraction of a second later the brake pressure starts to rise at a rate of nearly 700 psi/sec. This rate is continued until the preselected deceleration is reached. The system then maintains this (deceleration) level until the aircraft is finally stopped, unless the modes of the system mentioned earlier are practiced, or the pilot elects to transfer over to manual braking or to initiate a semi-automatic smooth and linear pressure reduction termed "OFF" ramp or in the logic diagram of FIG. 7 "Autobrake Smooth Manual Override".

The "OFF" ramp can be thought of as roughly the reverse of the "ON" ramp in that brake pressure is reduced rather than increased at a rate of several hundred psi/sec. The pilot can initiate the "OFF" ramp at any time during the landing roll by applying and holding a light pressure on either or both brake pedals or by moving the deployed ground spoiler (speed brake) handle forward to a position range near vertical. The OFF ramp reduces brake pressure to a level near brake retractor spring pressure (retractor spring pressure is that amount of brake pressure which could be applied to the brake without resulting in brake torque being applied, and for present aircraft this is in the range of 100-200 psi). The OFF ramp signal shown as an input to the automatic brake modulator circuit of FIGS. 13 and 14 is generated by closing one or both brake pedal switches or by closing of the ground spoiler handle, also termed herein and labeled "OFF Ramp Switch".

Normal ground operation calls for a gradual smooth transition. This smoothness is transition can be obtained after the "OFF" ramp has reduced the brake pressure down to brake retractor spring pressure as hereinbefore described; however, this procedure alone would not be satisfactory from an operational point of view. Therefore, the previously mentioned pressure comparators 110 (see FIG. 2) are incorporated in this system. The pressure comparators permit smooth transfer to manual braking by slow normal application of brakes. When during this transfer the pilot's metered pressure at either or both comparators rises to a value that is 50 psi below the automatically controlled brake pressure, the comparator sends an equal pressure signal to automatic brake logic circuit 58 as shown in FIG. 2. The automatic brake logic circuit then generates an "autobrakes off" signal to the solenoid valves as shown in FIG. 2, and these solenoid valves return to their normally closed position thereby connecting the shuttle valve side ports of the solenoid valves to return. As a result, the brake pressures tends to drop but substantially simultaneously the fast switching shuttle valves shuttle manual pressure to the brakes and avoid any significant changes in brake pressure. In this manner, a smooth transition from automatic to the manual braking mode is achieved. Instantaneous transition to manual braking is achieved by fast pedal application. A pair of pedal limit switches provides redundancy for instantaneous pedal override. Actuation of these switches by full manual brake application de-energizes the automatic braking system. Release of pedals after light application of brake pedals also causes an instantaneous release of automatic braking.

It will now be appreciated that the automatic brake system can be de-energized to obtain zero brake pressure instantly and at any time by advancement of either or both throttle lever past the 25° position (go around mode), or by placing the ground spoiler lever in the down detent. Further, the automatic brake system will not operate if any of the following conditions exists:
a) Electrical power is lost.
b) The automatic brake selector switch is in the off position.
c) The spoiler handle is in the down detent.
d) The anti-skid system is inoperative.
e) The parking brake valve is closed.
f) Throttle position advanced beyond 25°.

The system was designed with three basic failure mode considerations in mind:
a) No single probable failure shall cause locking up of more than two wheels symmetrically disposed (no asymmetry).
b) No single probable failure shall cause release of more than two brakes symmetrically disposed (no asymmetry).
c) No single probable failure shall cause inadvertent application of any brake with the automatic braking system unarmed.

A failure monitoring and warning circuit is included in the system. Failures detected by this circuit are indicated to the pilot by an amber "autobrake inop" light at the autobrake control panel in the cockpit.

Brake pressure control during automatic braking is paired such that inboard and outboard wheel pairs are controlled separately. This assures a symmetrical braking during automatic braking even in the event of a system failure.

The automatic braking system contains also a pressure balance circuit shown in the FIG. 13 portion of FIGS. 13 and 14. This circuit balances inboard and outboard brake pressures to assure that all brakes consume their proper share of the total brake energy independent of local runway conditions.

Figure 5:
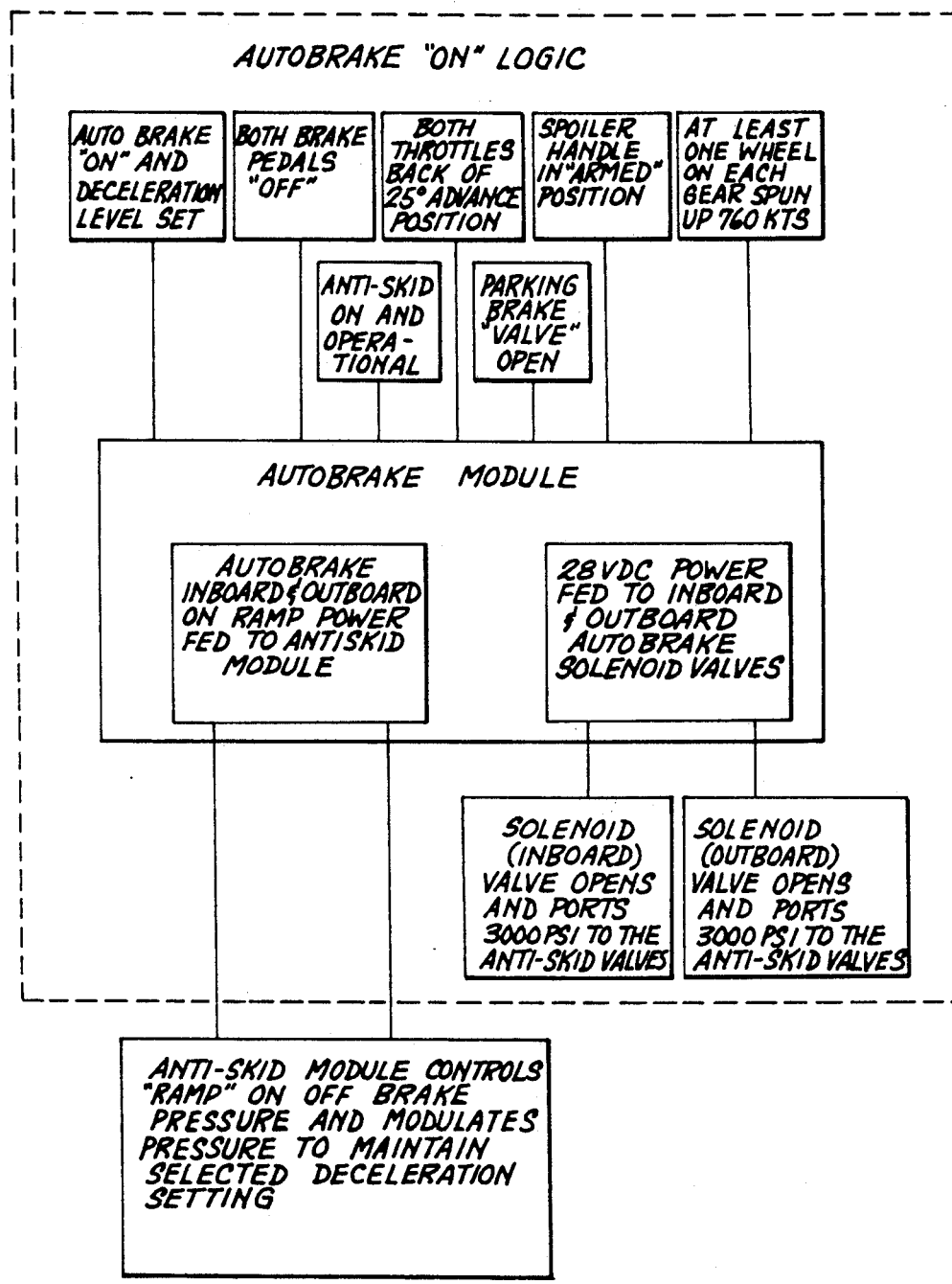
FIG. 5 is a logic diagram in block form illustrative of the present automatic braking system ON logic helpful in understanding the turn on mode of the system.

When the proper switching logic, shown in FIG. 5, is satisfied at touchdown, the autobrake control system energizes the two solenoid valves. This supplies 3000 psi hydraulic power to the anti-skid valves of each system. The anti-skid control circuit, upon receipt of "ON Ramp" power from the automatic brake modulator circuit (see FIG. 2), controls the anti-skid valves driving current such that brake pressure is increased at a controlled rate as described earlier.

The autobraking system is unilaterally dependent on the normal anti-skid system, and the anti-skid system will override any autobrake system generated brake control signals if and when required; i.e., if a wheel skid occurs during autobraking, the anti-skid system will execute the proper brake pressure correction.

The hydraulic power for the automatic braking system is obtained by the brake hydraulic distribution system, as discussed earlier and more readily seen by reference to FIGS. 8 and 9 which illustrate the actual hydraulic flow paths in this system under conditions of manual braking and automatic braking, respectively. This system provides a parallel hydraulic path that allows the bypassing of full system pressure around the manual brake metering valves to the pressure ports of the anti-skid valves. Specifically, a solenoid valve, a pressure comparator, two shuttle valves, and the necessary hydraulic lines have been added to each hydraulic power system supplying the landing gear brakes. Each solenoid valve is connected directly to the system supply line of its respective system. When energized, as in FIG. 9 during the automatic braking, a solenoid valves port 3000 psi through the shuttle valves to the pressure ports of the two anti-skid valves in the respective system.

The pressure comparator, shown in FIG. 2 and now in FIGS. 8 and 9, is a hydraulically actuated electrical transducer that works on the LVDT (Linear Variable Differential Transformer) principle. This transducer senses the differential pressure between the brake port of the associated brake metering valve and the brake itself. The pressure comparators are provided in the complete hydraulic system of FIG. 2; one is installed in the left-hand outboard, the other in the right-hand inboard brake subsystems. By this arrangement and because of the operating characteristics of the manual control system, the left-hand outboard comparator senses metered pressure from left brake pedal inputs, and the right-hand inboard comparator senses metered pressure from right-hand brake pedal inputs. The comparators are used in conjunction with two brake pedal switches mentioned earlier to achieve a smooth brake pressure transfer from automatic to manual braking.

Figure 6:
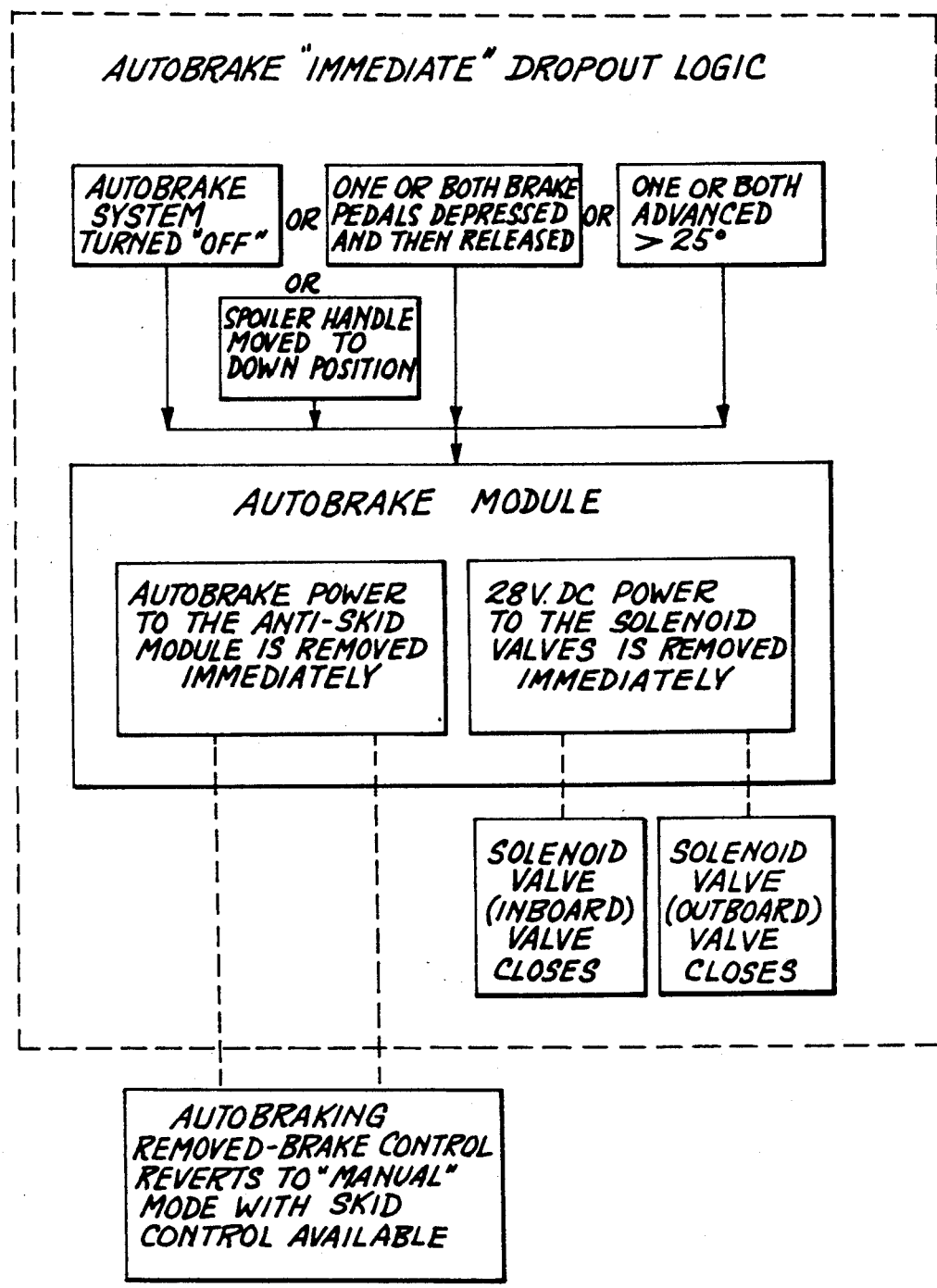
FIG. 6 is a logic diagram in block form illustrative of the switching logic of the system required to achieve one mode of automatic braking system turn OFF.
Figure 7:
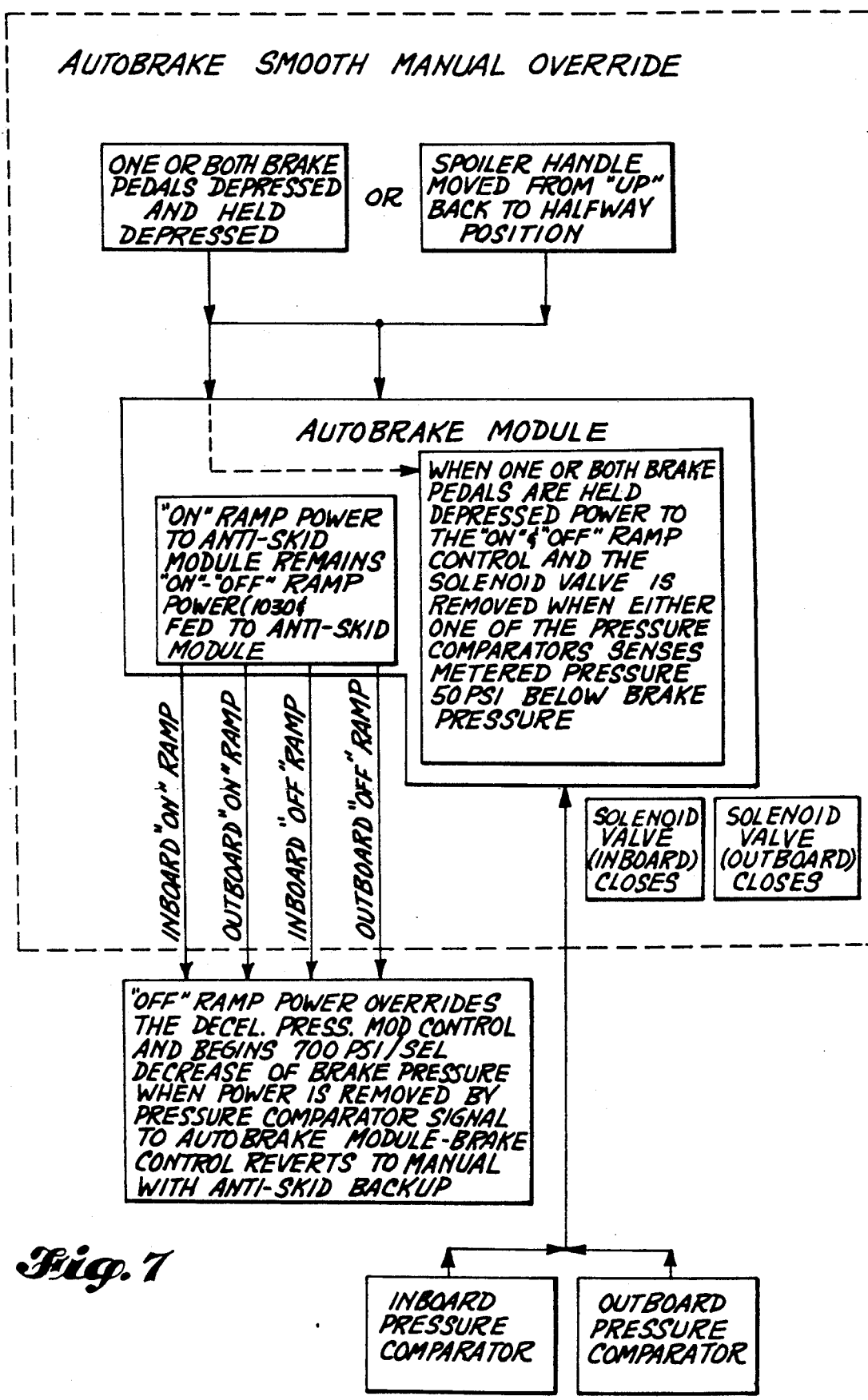
FIG. 7 is a further logic diagram in block form illustrative of the manner in which switching logic of the system is operative upon input commands to provide control of the system which results in a further mode of automatic braking system turn OFF.

The switching logic necessary for the immediate and the smooth removal of automatic brakes is illustrated in FIGS. 6 and 7. When immediate removal logic is satisfied, as in FIG. 6, the control signal supplied to the solenoid valves and the power to the autobrake modulator circuits is immediately removed. This allows the pilot to alter the braking effort manually.

When the switching logic for "Autobrake Smooth Manual Override" is satisfied, as shown in FIG. 7, the autobrake modulator circuit supplies 28 volts D.C. inboard and outboard power to the "OFF Ramp" circuitry shown therein (see FIG. 14 portion of FIGS. 13 and 14). This removes the deceleration control brake pressure modulation and begins the decrease of brake pressure at a controlled rate of approximately 700 psi/sec. Power to the solenoid valves is then removed when either one or both of the pressure comparators switch "ON", again reverting brake control to the pilot controlled manual mode. Once the automatic brake system has been de-energized, it cannot be reapplied unit it is reset by stowing the spoiler handle in the down position.

We claim:

1. In an automatic wheel brake control system for a plurality of aircraft wheels, the combination comprising:
   automatic brake control circuit means for generating automatic brake control signals when the combined wheelspeed of at least two of said plurality of aircraft wheels exceeds a predetermined value;
   antiskid control circuit means for generating antiskid control signals;
   antiskid valve means responsive to said automatic brake control signals and said antiskid control signals for controlling brake pressure applied to at least one of said plurality of aircraft wheels;
   a shuttle valve having first and second input ports and an output port;
   solenoid valve means coupled to said automatic brake control circuit means and responsive thereto for transmitting main hydraulic system pressure to said first input port of said shuttle valve;
   pedal control means for manually metering brake pressure to said second input port of said shuttle valve;
   said shuttle valve shuttling either manually metered brake pressure or automatic system pressure through said shuttle valve output port to said antiskid valve means when the difference of said manually metered brake pressure and said automatic system pressure exceeds a predetermined value.

2. The invention according to claim 1 wherein said pedal control means includes pedal override input signal generating means coupled to said automatic brake control circuit for preventing the application of said automatic brake control signals to said antiskid valve means.

3. An automatic braking system for an aircraft comprising in combination:
   wheelspeed logic circuits for generating a wheelspeed logic output control signal when a pair of wheels disposed on opposite sides of the aircraft are turning at a combined wheelspeed exceeding a predetermined value;
   AND circuit means have a plurality of input terminals and an output terminal;
   means for coupling said wheelspeed logic output control signals to a first of said plurality of input terminals;
   braking switching means coupled to a second of said plurality of input terminals;
   throttle switching means coupled to a third of said plurality of input terminals;
   antiskid valve means;
   automatic brake modulator means coupled to the output of said AND circuit to provide automatic brake control signals;
   antiskid control circuit means for generating antiskid control signals; and
   means for coupling said automatic brake control signals and said antiskid control signals to said antiskid valve means.

4. The invention according to claim 3 wherein each of the wheelspeed logic circuits includes a plurality of OR circuits.

5. The invention according to claim 3 further comprising pressure comparator means for generating a pressure compare signal when the difference between manual and automatic brake pressures demanded exceeds a predetermined value, and means for coupling said pressure compare signal to a fourth of said plurality of input terminals of said AND circuit means.

6. The invention according to claim 3 wherein said automatic brake modulator means comprises an inboard automatic brake modulator circuit for generating first and second automatic brake control signals for controlling pressures to the respective brakes of an inboard pair of wheels disposed on opposite sides of the aircraft, and an outboard automatic brake modulator circuit for generating third and fourth automatic brake control signals for controlling pressures to the respective brakes of an outboard pair of wheels disposed on opposite sides of the aircraft.

7. The invention according to claim 6 further comprising pressure balance circuit means coupled between said inboard automatic brake modulator circuit and said outboard brake modulator circuit.

8. The invention according to claim 3 wherein said automatic brake signals comprise a ramp function initiated in response to the automatic braking system turn on control signal provided at the output terminal of said AND circuit.

9. The method of braking a first wheel on a first side of a plane passing through the fuselage of an aircraft and a second wheel on the remaining side of said plane comprising the following steps:
   measuring the wheelspeeds of said first and second wheels;
   applying a constant braking pressure to said first and second wheels for a first predetermined period of time after said wheelspeeds of said first and second wheels exceed a predetermined wheelspeed value;
   applying braking pressure subsequent to said first predetermined time period at an increasing rate of said first and second wheels until the rate of deceleration of said aircraft equals a predetermined rate of deceleration; and,
   adjusting braking pressure to said first and second wheels to maintain constant said predetermined rate of deceleration of said aircraft.

10. The method of claim 9 wherein said step of applying braking pressure at an increasing rate comprises applying braking pressure in accordance with a ramp function.

11. An automatic braking system for an aircraft comprising in combination:
   wheelspeed logic circuits for generating a wheelspeed logic output signal when a pair of wheels disposed on opposite sides of the aircraft are turning at a wheelspeed exceeding a predetermined value;
   AND circuit means having a plurality of input terminals and an output terminal;
   means for coupling said wheelspeed logic output control signals to a first of said plurality of input terminals;
   brake switching means coupled to a second of said plurality of input terminals;
   valve means;
   automatic brake modulator means coupled to the output of said AND circuit to provide automatic brake control signals;
   antiskid control circuit means for generating antiskid control signal; and
   means for coupling said automatic brake control signals and said antiskid control signals to said valve means.

12. A brake control system for applying and controlling a brake application means for a wheel of a vehicle independently of operator brake application comprising:

signal generating means for producing a first signal that is related to the rotational speed of said wheel;

reference generating means for generating a reference signal;

rate selector means for manually selecting said reference signal indicative of a desired rate of vehicle deceleration;

comparison means for comparing said first signal with said reference signal for generating an error signal indicative of the difference between said first signal and said reference signal; and control means for providing a signal to said brake application means to apply brake pressure to said wheel independently of operator brake application and responsive to said error signal to provide a selected deceleration brake control signal for controlling said brake pressure in order to maintain said desired rate of deceleration.

13. A brake control system as recited in claim 12, wherein said deceleration brake control signal comprises a time integral function of said error signal.

14. A brake control system as recited in claim 12, wherein said deceleration control system further comprises a deceleration control turn-on means for causing said control means to provide an initial deceleration brake control signal of maximum value commanding a full brake release followed by a gradual decrease from said maximum value to permit a corresponding gradual increase in brake pressure.

15. A brake control system as recited in claim 12, further comprising means for deactuating said control means and for causing said control means incident to said deactuation to provide a deceleration brake control signal of gradually increasing value to permit a gradual decrease in brake pressure.

16. A brake control system as recited in claim 12, wherein said signal generating means includes means for producing a wheelspeed signal that is a function of the rotational speed of said wheel and differentiating means for converting said wheelspeed signal into said first signal that is a function of the rate of deceleration of said wheel, and wherein said reference generating means generates a preselected constant magnitude reference deceleration signal.

17. A brake control system as recited in claim 12, further comprising an antiskid control means to control said brake application means whereby said antiskid control means controls said brake applications means only when said deceleration brake control signal would cause said wheel to skid.

18. In combination in an automatic brake control system including brake application means responsive to a control signal to brake a wheel of a vehicle:

first means for generating a first signal proportional to the the rate of deceleration of the wheel;

second means for generating a second signal representative of a desired rate of deceleration of the wheel;

an integrator circuit having an input, and output, and including capacitive feedback means coupled between said input and said output;

an automatic brake logic circuit for providing an autobrake turn-on signal when automatic braking is to be initiated;

on-ramp control circuit means providing an on-ramp signal having a relatively short duration in response to each said autobrake turn-on signal;

means combining said first, said second and said on-ramp signals at said input of said integrator means whereby said capacitive feedback means is initially charged by said on-ramp signal to provide a control signal at said output of said integrator means which commands a low brake pressure, and is thereafter discharged at a rate dependent on the difference between said first and said second signals to provide a control signal which commands an increasing brake pressure up to a brake pressure representative of the difference between said first and said second signals; and means coupling said control signal to the brake application means.

19. The combination as recited in claim 18, wherein said on-ramp control circuit means comprises a potential source enabled by said autobrake turn-on signal, and resistance means and a capacitance means connected in series between said potential source and said input of said integrator.

20. In combination in an automatic brake control system including brake application means responsive to a control signal to brake a wheel of a vehicle:

first means for generating a first signal proportional to the rate of deceleration of the wheel;

second means for generating a second signal representative of a desired rate of deceleration of the wheel;

an integrator circuit having an input, an output, and including capacitive feedback means coupled between said input and said output;

a pilot-controlled switching means providing an autobrake turn-off signal when said automatic braking is to be terminated;

off-ramp control circuit means providing an off-ramp signal in response to each said autobrake turn-off signal;

means combining said first signal, said second signal, and said off-ramp signal at the input of said integrator whereby said integrator normally provides a control signal at said output which commands a brake pressure representative of the difference between said first and said second signals, and whereby said off-ramp signal is sufficiently large with respect to the difference between said first and said second signals to charge said capacitive feedback means to provide a control signal at said output of said integrator which commands a decreasing brake pressure from the value representative of the difference between said first and said second signals down to a low brake pressure.

21. The combination as recited in claim 20, wherein said off-ramp control circuit means comprises a potential source enabled by said autobrake turn-off signal and a resistance means connected in series between said potential source and said input of said integrator.

22. In combination in an automatic wheel brake control system for an aircraft:

means for generating signals representative of wheelspeed;

wheelspeed logic means connected to said means for generating signals representative of wheelspeed for providing a first signal when said wheel has spun-up from substantially zero to a predetermined wheelspeed;

pilot-controlled logic means for providing a second signal when automatic braking is to be initiated;

an automatic braking logic circuit for providing an autobrake turn-on signal only upon the concurrence of said first and said second signals;

valve means for controlling brake pressure application; and means coupled between said means for generating signals representative of wheelspeed and said valve means, for generating brake control signals to increase brake pressure and decelerate the wheel to one of a plurality of manually selectable deceleration rates in response to said autobrake turn-on signal.

23. A brake control system for applying and controlling a brake application means for a wheel of an aircraft independently of operator brake application comprising:

signal generating means for producing a first signal that is related to the rotational speed of said wheel;

reference generating means for generating a reference signal;

rate selector means for manually selecting said reference signal indicative of a desired rate of aircraft deceleration;

comparison means for comparing said first signal with said reference signal for generating an error signal indicative of the difference between said first signal and said reference signal;

control means for providing a signal to said brake application means to apply brake pressure to said wheel independently of operator brake application in response to said error signal to provide a deceleration brake control signal for controlling said brake pressure in order to maintain said desired rate of deceleration;

wheelspeed logic means connected to said signal generating means for providing a wheelspeed logic signal when said wheel has spun-up from substantially zero to a predetermined rotational speed;

pilot-controlled logic means for providing an arming signal when automatic braking is to be initiated; and automatic brake logic means for enabling said control means upon the concurrence of said wheelspeed logic and said arming signals.

24. A brake control system as recited in claim 23, wherein said deceleration brake control signal comprises a time integral function of said error signal.

25. A brake control system as recited in claim 23, wherein said deceleration control system further comprises a deceleration control turn-on means responsive to said automatic brake logic means for causing said control means to provide an initial deceleration brake control signal of maximum value commanding a full brake release followed by a gradual decrease from said maximum value to permit a corresponding gradual increase in brake pressure.

26. A brake control system as recited in claim 23, further comprising means for deactuating said control means and for causing said control means incident to said deactuation to provide a deceleration brake control signal of gradually increasing value to permit a gradual decrease in brake pressure.

27. A brake control system as recited in claim 23, wherein said signal generating means includes means for producing a wheelspeed signal that is a function of the rotational speed of said wheel, and differentiating means for converting said wheel-speed signal into said first signal that is a function of the rate of deceleration of said wheel, and wherein said reference generating means generates a preselected constant magnitude reference deceleration signal.

28. A brake control system as recited in claim 23, further comprising an antiskid control means to control said brake application means whereby said antiskid control means controls said brake application means only when said deceleration brake control signal would cause said wheel to skid.

29. A deceleration control system for applying and controlling the brake application means associated with each wheel of a group of braked load-bearing wheels of an aircraft independently of operator brake application comprising:

signal generating means for each of said wheels for producing a first signal that is related to the rotational speed of its associated wheel;

reference generating means for generating a reference signal;

rate selector means for manually selecting said reference signal indicative of a desired rate of aircraft deceleration;

averaging means responsive to the first signal associated with each of said wheels to form an average signal therefrom;

comparison means for comparing said average signal with said reference signal for generating an error signal indicative of the difference between said average signal and said reference signal;

control means for providing a signal to said brake application means to apply brake pressure to said wheels of said group independently of operator brake application and responsive to said error signal to provide a deceleration brake control signal for controlling said brake pressure in order to maintain said desired rate of deceleration;

wheelspeed logic means connected to at least one of said signal generating means for providing a wheelspeed logic signal when said associated wheel has spun-up from substantially zero to a predetermined rotational speed;

pilot-controlled logic means for providing an arming signal when automatic braking is to be initiated; and automatic brake logic means for enabling said control means only upon the concurrence of said wheelspeed logic and said arming signals.

30. A deceleration brake control system as recited in claim 29, wherein said deceleration brake control signal comprises a time integral function of said error signal.

31. A deceleration control system as recited in claim 29, further comprising a deceleration control turn-on means responsive to said automatic brake logic means for causing said control means to provide an initial deceleration brake control signal of maximum value commanding a full brake release followed by gradual decrease from said maximum value to permit the corresponding gradual increase in brake pressure.

32. A deceleration control system as recited in claim 29, further comprising means for deactuating said control means and for causing said control means incident to said deactuation to provide a deceleration brake control signal of gradually increasing value to permit a gradual decrease in brake pressure.

33. A deceleration control system as recited in claim 29, wherein each said signal generating means includes means for producing a wheelspeed signal that is a function of the rotational speed of its associated wheel, and differentiating means for converting said wheelspeed signal into said first signal that is a function of the rate of deceleration of said associated wheel, and wherein said reference generating means generates a preselected constant magnitude reference deceleration signal.

34. A deceleration control system as recited in claim 29, further comprising an antiskid control means to control said brake application means whereby said antiskid control means controls said brake application means only when said deceleration brake control signal would cause said wheels to skid.

35. A deceleration control system for an aircraft having plural groups of braked load-bearing wheels for applying and controlling a brake application means for said wheels independently of operator brake applications, said system comprising:

- signal generating means associated with each of said wheels for producing a first signal that is related to the rotational speed of its associated wheels;
- reference generating means for generating a reference signal;
- rate selector means for manually selecting said reference signal indicative of a desired rate of aircraft deceleration;
- averaging means for each of said wheel groups responsive to the first signals associated with each of said wheels in said group to form an average signal therefrom;
- comparison means for each of said wheel groups for comparing said average signal for the associated wheel group of said reference signal for generating an error signal indicative of the difference between said average signal for the associated wheel group and said reference signal;
- control means associated with each group of wheels for providing a signal to said brake application means to apply brake pressure to said wheels independently of operator brake application and responsive to said error signal to provide a deceleration brake control signal for controlling said brake pressure in order to maintain said desired rate of deceleration;
- wheelspeed logic means connected to at least one of said signal generating means in each of said wheel groups for providing a wheelspeed logic signal when said associated wheels have spun-up from substantially zero to a predetermined rotational speed;
- pilot-controlled logic means for providing an arming signal when automatic braking is to be initiated; and
- automatic brake logic means for enabling each of said control means only upon the concurrence of said wheelspeed logic and said arming signals.

36. A deceleration control system as recited in claim 35, wherein each of said deceleration brake control signals comprises a time integral function of said error signal.

37. A deceleration control system as recited in claim 36, further comprising pressure balance means associated with each of said control means for comparing the time integral function formed thereby with the time integral function formed by another of said control means associated with another wheel group to cause the time integral function formed by said associated control means to command a brake pressure level not less than that commanded by said other control means.

38. A deceleration control system as recited in claim 35, further comprising, for each of said wheel groups, a deceleration control turn-on means responsive to said automatic brake logic means for causing said control means associated therewith to provide an initial deceleration control brake signal of maximum value commanding a full brake release followed by a gradual decrease from said maximum value to permit a corresponding gradual increase in brake pressure.

39. A deceleration control system as recited in claim 35, further comprising, for each of said wheel groups, means for deactuating said control means associated therewith, and for causing said associated control means incident to said deactuation to provide a deceleration brake control signal of gradually increasing value to permit a gradual decrease in brake pressure.

40. A deceleration control system as recited in claim 35, wherein said signal generating means associated with each of said wheels includes means for producing a wheelspeed signal that is a function of the rotational speed of its associated wheel, differentiating means for converting said wheelspeed signal into said first signal that is a function of the rate of deceleration of said associated wheel, and wherein said reference generating means generates a preselected constant magnitude reference deceleration signal.

41. A deceleration control system as recited in claim 35, further comprising an antiskid control means associated with each group of wheels to control said brake application means whereby said antiskid control means controls said associated brake application means only when said associated deceleration brake control signal would cause said wheels to skid.

42. A deceleration control system as recited in claim 35, further comprising pressure balance means interconnecting each of said control means with each other to equalize the values of said deceleration brake control signals provided thereby so that each of said control means commands the same brake pressure level.

* * * * *

UNITED STATES PATENT AND TRADEMARK OFFICE
CERTIFICATE OF CORRECTION

PATENT NO. : 5,024,491

DATED : June 18, 1991

INVENTOR(S) : George E. Pease, Jr. et al.

It is certified that error appears in the above-identified patent and that said Letters Patent is hereby corrected as shown below:

| Column | Line   |                                                            |
|--------|--------|------------------------------------------------------------|
| 2      | 13     | delete "off" and insert therefor --of--                    |
| 3      | 25, 26 | delete "in automatic braking"                              |
| 3      | 30     | delete "is" and insert therefor --are--                    |
| 3      | 30     | delete "schomatic" and insert therefor --schematic--       |
| 4      | 25     | delete "OR" and insert therefor --or--                     |
| 4      | 30     | delete "AND" and insert therefor --and--                   |
| 4      | 32     | delete "OR" and insert therefor --or--                     |
| 4      | 34     | delete "AND" and insert therefor --and--                   |
| 4      | 68     | delete "buss" and insert therefor --bus--                  |
| 5      | 10     | delete "switches" and insert therefor --switches'--        |
| 5      | 31     | delete "to" and insert therefor --too--                    |
| 6      | 9      | delete "then" and insert therefor --than--                 |
| 6      | 21     | delete "valves" and insert therefor --valves'--            |
| 6      | 35     | delete "to" and insert therefor --from--                   |
| 6      | 38     | insert --of-- after "each"                                 |
| 6      | 55     | delete "signals" and insert therefor --signals'--          |
| 7      | 29     | insert a comma (--,--) after "which"                       |
| 7      | 30     | insert a comma (--,--) after "signals"                     |
| 7      | 63     | delete "breaking" and insert therefor --braking--          |

UNITED STATES PATENT AND TRADEMARK OFFICE
CERTIFICATE OF CORRECTION

PATENT NO. : 5,024,491

DATED : June 18, 1991

INVENTOR(S) : George E. Pease, Jr. et al.

It is certified that error appears in the above-identified patent and that said Letters Patent is hereby corrected as shown below:

| | | |
|---|---|---|
| 8 | 1 | delete "circuit 78" and insert therefor --circuit 56-- |
| 8 | 9 | delete "73" and insert therefor --78-- |
| 8 | 46 | delete "cause" and insert therefor --causes-- |
| 8 | 51 | delete "inputs." and insert therefor --inputs).-- |
| 11 | 67 | delete "Automatic" and insert therefor --Autobrake-- |
| 12 | 8 | delete "provide" and insert therefor --provides-- |
| 12 | 55 | delete "is" and insert therefor --in-- |
| 13 | 22 | delete "lever" and insert therefor --levers-- |
| 13 | 66 | delete "valves" and insert therefor --valves'-- |
| 14 | 22 | delete "a" and insert therefor --the-- |
| 14 | 65 | delete "unit" and insert therefor --until-- |
| 15 | 62 | delete "the" and insert therefor --said-- |
| 16 | 34 | delete "of" and insert therefor --to-- |

UNITED STATES PATENT AND TRADEMARK OFFICE
CERTIFICATE OF CORRECTION

PATENT NO. : 5,024,491

DATED : June 18, 1991

INVENTOR(S) : George E. Pease, Jr. et al.

It is certified that error appears in the above-identified patent and that said Letters Patent is hereby corrected as shown below:

| | | |
|---|---|---|
| 16 | 65 | delete "signal" and insert therefor --signals-- |
| 17 | 59 | delete "the" (second occurrence) |
| 17 | 63 | delete "and" and insert therefor --an-- |
| 18 | 57 | add a comma (--,--) after "signal" |
| 20 | 1 | delete "wheel-speed" and insert therefor --wheelspeed-- |
| 21 | 17, 18 | delete "applications" and insert therefor --application-- |

Signed and Sealed this

Second Day of March, 1993

Attest:

STEPHEN G. KUNIN

*Attesting Officer*   *Acting Commissioner of Patents and Trademarks*